Aug. 16, 1932.  K. PFEIFFER  1,872,495
BRAKE TESTING MACHINE
Filed Oct. 25, 1930  2 Sheets-Sheet 1
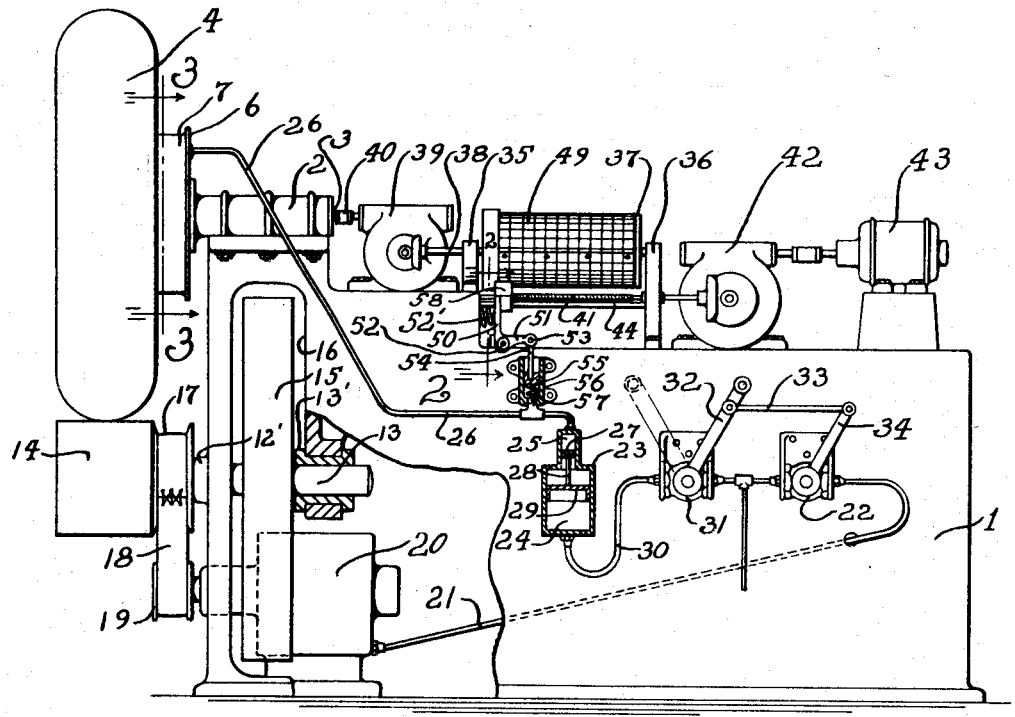
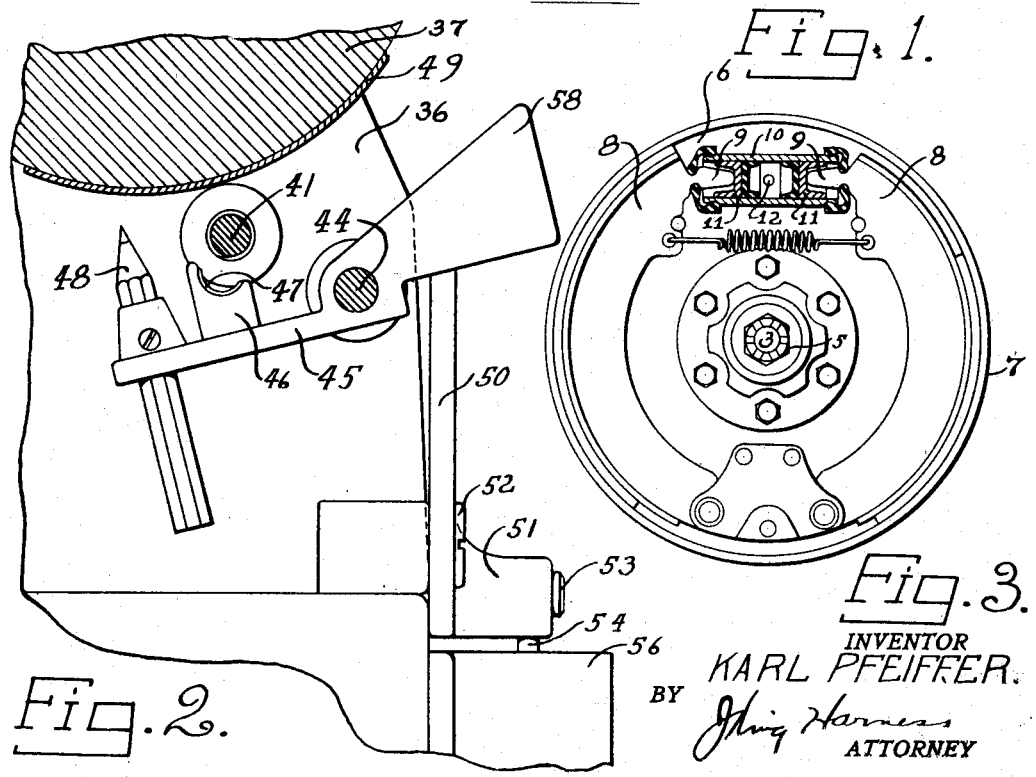
Fig. 1.
Fig. 2.
Fig. 3.
INVENTOR
KARL PFEIFFER.
BY
ATTORNEY Patented Aug. 16, 1932

1,872,495

UNITED STATES PATENT OFFICE

KARL PFEIFFER, OF HIGHLAND PARK, MICHIGAN, ASSIGNOR TO CHRYSLER CORPORATION, OF DETROIT, MICHIGAN, A CORPORATION OF DELAWARE

BRAKE TESTING MACHINE

Application filed October 25, 1930. Serial No. 491,301.

The main objects of this invention are to provide an improved brake testing machine; to provide a machine of this kind by which vehicle brake drums and brake linings are tested under conditions that are substantially the same as those to which they are subjected in the operation of a vehicle; to provide brake testing apparatus which has a road wheel engaging member that has an inertia element for driving the road wheel with a force which is substantially equal in intensity to the force with which the wheels of a vehicle of a known weight are driven by their reaction with the surface of a road when the vehicle is moving at a predetermined speed under its own inertia; to provide means for conditioning a machine of this character so as to simulate the brake reactions of the wheels of vehicles of different weights and under different operating speeds; to provide means for recording the time and distance required to completely stop rotation of a vehicle wheel by its brakes; and to provide means of this kind for graphically recording the circumferential travel of a wheel that occurs in successive time intervals during the braking operation.

An illustrative embodiment of the invention is shown in the accompanying drawings, in which:

Fig. 1 is a side elevation of my improved brake testing machine.

Fig. 2 is an enlarged fragmentary section taken on the line 2—2 of Fig. 1.

Fig. 3 is an enlarged vertical section taken on the line 3—3 of Fig. 1 and showing the braking apparatus of a vehicle wheel.

Figure 4:
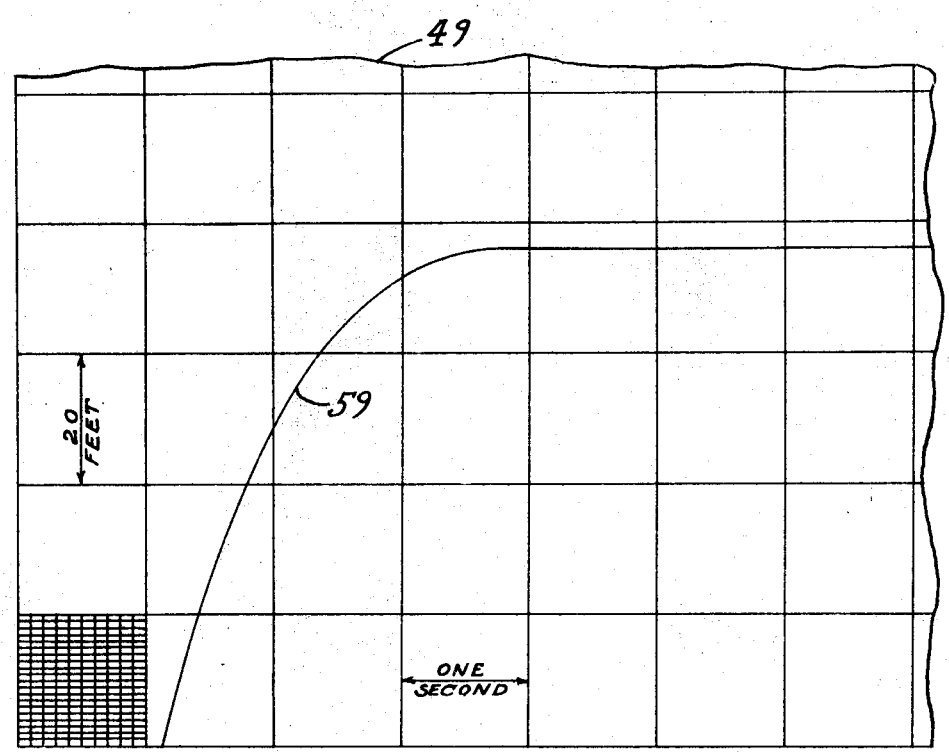
Fig. 4 is a fragmentary plan view of chart on which the braking characteristics are recorded.

In the form shown, the brake testing machine includes a bed or supporting structure 1 on which is mounted a journal bearing 2 that is substantially identical in construction to the outer end portion of a rear axle housing of a vehicle. Journaled in the bearing 2 is an axle or shaft 3 on which a vehicle wheel having a tire 4 is mounted in a conventional manner by a nut 5. A disc shape support 6 is provided on the outer end of the bearing member 2 for holding the brake apparatus, shown in Fig. 3, in operative relation with respect to a brake drum 7 on the vehicle wheel. This braking apparatus includes a pair of pivotally mounted shoes 8 having lugs 9 on their free extremity which extend into the ends of a cylinder 10 and bear against a pair of pistons 11 slidably mounted in the cylinder. The cylinder 10 has an inlet opening 12 through which a fluid medium such as oil is supplied under pressure for operating the brake shoes 8.

Journaled in bearings 12' and 13' formed in the bed 1 of the machine is a shaft 13 having a drum 14 on its outer end which registers with and receives the periphery of the tire 4 of the wheel. The inner end of the shaft is provided with an inertia member or flywheel 15 which is received in a recess 16 formed in the body of the bed 1. The drum has a groove 17 in its periphery for receiving a belt 18 which passes around a pulley 19 on an air motor 20. The air motor 20 is located between the side walls of the bed and is adapted to drive the drum 14 at a predetermined speed which in turn frictionally drives the vehicle wheel at a predetermined lower speed. Air is supplied to the motor from a source, not shown, by a pipe 21 which has a valve 22 for energizing and de-energizing the motor 20.

A hydraulic brake operating system having a pneumatic actuating member 23 which includes a pair of cylinders 24 and 25 is provided for applying the brake shoes 8. This system includes a pipe 26 which communicates at one end with an inlet opening 12 of the brake cylinder 10 and at its other end with an outlet of the cylinder 25. The tube 26 and cylinder 25 are filled with a suitable liquid medium such as oil, which is placed under pressure by a piston 27 slidably mounted in the cylinder 25 and rigidly connected by a piston rod 28 with a piston 29 which is slidably mounted in the cylinder 24 of the brake actuating member 23. The cylinder 24 has an air inlet which communicates with a pipe 30 that leads from a source of air pressure, not shown, and which is provided with a valve 31.

The valve 31 has an operating lever 32 which is connected by a link 33 with an operating lever 34 of the valve 22. When the operating lever 32 of the valve 31 in the brake applying system is in an "off" position, the link 33 holds the operating lever 34 of the valve 32 in an "on" position, and when the lever 32 is moved to its "on" position, shown in dotted lines in Fig. 1, the link 33 moves the lever 34 to its "off" position.

Rotatably mounted on supports 35 and 36 on the top of the bed 1 of the machine is a drum 37 which has a rigidly attached shaft 38 that is connected with the shaft 3 on which the vehicle wheel is supported by a reducing gear unit 39 and a coupling 40. The reducing gear unit 39 rotates the drum 37 at a predetermined rate with respect to the rotation of the wheel causing twenty feet of circumferential travel of the wheel to produce one inch of circumferential movement of the periphery of the drum. A worm threaded member 41, journaled in the supports 35 and 36 and located directly below the drum 37 is rotated at a fixed rate by a reducing gear unit 42 which is driven by a motor 43. Slidably and pivotally mounted on a rod 44 which is mounted at its ends on the supports 35 and 36 is a marker 45, having an intermediate lug 46 that is provided with a concave face on which threads 47 are formed. The threads 47 correspond in pitch with the threads of the member 41 and they co-act with the threaded member 41 to shift the marker 45 longitudinally with respect to the drum. The marker carries a pencil 48 which is adapted to bear upon a sheet or chart 49 wrapped upon the periphery of the drum 37.

A catch including a bell crank lever having a substantially upright arm 50 and a substantially horizontal arm 51 is pivotally mounted at 52 on the bed 1 of the machine and the upper extremity of the arm 50 of the catch is normally held in registration with an outer end portion of the marker 45 by a spring 52' so as to releasably hold the marker in an inoperative position, as shown in Fig. 2. Pivoted at 53 to the outer end of the horizontal arm 51 is a piston rod 54 against which a piston 55 bears. The piston 55 is slidably mounted in a cylinder 56 which communicates at its lower end with a fluid medium pipe 26 of the brake applying system. The piston 55 is normally held in an intermediate position with respect to the length of the cylinder 56 by a spring 57. When the fluid medium of the brake applying system is placed under compression the piston 55 is moved upwardly rotating the catch in a counterclockwise direction, as viewed in Fig. 1 and moving the extremity of its upright arm 50 out of registration with the marker. The marker is then rotated upon the rod 44 in a clockwise direction, as viewed in Fig. 2, by a weight 58 on its outer end.

In operation, a vehicle wheel having a tire 4 is mounted on the axle 3 which is journaled in the bearing 2 of the machine, with the brake drum of the wheel in an operative relation to the braking mechanism which is carried by the support 6 of the bearing 2. This set up is the same whether the brake drum or the brake lining are to be separately or collectively tested. The operating lever 32 is then moved to its full line position shown in Fig. 1 so as to close the air valve 31 of the brake system and open the air valve 22 of the driving mechanism. The air motor drives the belt 18 and drum 14 and the latter in turn frictionally drives the wheel through engagement with its tire. After a predetermined speed of rotation has been attained, the lever 32 is moved to the dotted line position in Fig. 1, so as to shut off the supply of air to the motor 20 and open the air valve 31 which admits air into the air cylinder 24 of the actuating member 23. The pistons 27 and 29 are moved upwardly in this manner and the piston 27 places the fluid in the brake actuating system under compression. The brake shoes 8 are immediately applied to the inner periphery of the drum 7 and the arm 50 of the catch is rotated out of registration with the marker allowing the marker to rock in a clockwise direction until the point of the pencil 48 engages the chart 49 and the threads 47 of the lug 46 mesh with the worm of the member 41.

The inertia member 15 drives the wheel against the action of the braking mechanism with a predetermined force that is substantially equal to the driving effect of the road surface upon one wheel of a vehicle when the vehicle moves under its own inertia at a predetermined speed.

The driving mechanism is de-energized at the same instant the brakes are applied and the marker is connected with its driving member 41 simultaneously with these two operations so as to move the point of the pencil 48 axially of the drum during the braking period, forming a space time curve of the type shown in Fig. 4. The horizontal axis of the chart 49 is graduated in units of time, one inch being equal to one second, and the vertical axis is graduated in units of distance, one inch being equal to twenty feet. During the first stages of brake application, the drum 37 is rotated comparatively fast forming the inclined section 59 of the curve. As the wheel and drum are slowed down to a positive stop, the curve gradually becomes horizontal and when the marker reaches the end of its stroke, the threads 47 of the lug 46 run off of the worm of the member 41 and are received by a cylindrical end portion 60 of reduced diameter. The curve graphically shows the circumferential travel of the wheel during successive time intervals of the braking period.

With the above machine, it is possible to vary the inertia member 15 and to vary the speed of the wheel so as to simulate the reaction of the road surface with wheels of vehicles of various weights and operated at diverse speeds. In this manner, the braking mechanism, including the lining and drum are tested under conditions which are substantially identical to the condition to which they are subjected in normal operation of the vehicle.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. In a brake testing machine, means for rotatably supporting a vehicle wheel having a tire, a support for its wheel braking apparatus, driving mechanism co-acting with the periphery of said tire for rotating said wheel at a predetermined speed, an inertia member connected with said driving mechanism for rotating said wheel after said driving mechanism is de-energized so as to simulate the driving action between the wheels of a vehicle and the road surface upon which they run when the vehicle is propelled by its own inertia, means for applying the braking apparatus of said wheel, and a control mechanism for simultaneously de-energizing said driving mechanism and actuating said brake applying means.

2. A brake testing machine including means for rotatably supporting a vehicle wheel, a support for its braking apparatus, means for applying said braking apparatus including a control element, driving mechanism for rotating said wheel including a control element, means for operating the control elements of said brake applying means and said driving mechanism respectively so as to simultaneously energize one and de-energize the other, and an inertia member connected with said driving mechanism for rotating said wheel against the action of said braking apparatus after said driving mechanism is de-energized.

3. A brake testing machine including means for rotatably supporting a vehicle wheel, a fixed support for its braking apparatus, means for applying said braking apparatus including a control element, driving mechanism for rotating said wheel including a control element, means for operating the control elements of said brake applying means and said driving mechanism respectively so as to simultaneously energize one and de-energize the other and an instrument for graphically recording the circumferential travel of said wheel during application of said braking apparatus having a rotatable element driven by said wheel at a fixed rate relative to the rotation thereof.

4. A brake testing machine including means for rotatably supporting a vehicle wheel, a support for its braking apparatus, means for applying said braking apparatus including a control element, driving mechanism for rotating said wheel including a control element, means for operating the control elements of said brake applying means and said driving mechanism respectively so as to simultaneously energize one and de-energize the other, an inertia member connected with said driving mechanism for rotating said wheel against the action of said braking apparatus after said driving mechanism is de-energized, and an instrument including a rotatable element having a driving connection with said wheel for graphically recording the circumferential travel of said wheel during application of said braking apparatus.

5. A brake testing machine including means for rotatably supporting a vehicle wheel, a fixed support for its braking apparatus, means for applying said braking apparatus including a hydraulic system having a control element, driving mechanism for rotating said wheel having a control element, means for operating the control elements of said brake applying means, said operating means being adapted to simultaneously de-energize said driving mechanism and energize said brake applying system, an instrument having a marker for graphically recording the circumferential travel of said wheel, and means operable by said hydraulic system for conditioning said marker for operation when said braking apparatus is applied.

6. A brake testing machine including means for rotatably supporting a vehicle wheel, a support for its braking apparatus, means for applying said braking apparatus including a hydraulic system having a control element, driving mechanism for rotating said wheel having a control element, means for operating the control elements of said brake applying means, said operating means being adapted to simultaneously de-energize said driving mechanism and energize said brake applying system, an inertia member connected with said driving mechanism for rotating said wheel against the action of said braking apparatus after said driving mechanism is de-energized, an instrument having a marker for graphically recording the circumferential travel of said wheel, and means operable by said hydraulic system for conditioning said marker for operation when said braking apparatus is applied.

7. A brake testing machine including a bearing member for rotatably supporting a vehicle wheel and its drum, a support for the braking apparatus under inspection, means for applying said braking apparatus, driving mechanism for rotating said wheel, a recording drum having a driving connection with said wheel for rotating said recording drum at a fixed rate with respect to the rotation of said wheel, a marker located in close proximity to said drum, means for shifting said marker longitudinally of said drum including a driving member having a fixed speed of rotation, a catch for releasably holding said marker in an inoperative position, and a member operable by said brake applying means for releasing said marker when the braking mechanism is applied.

KARL PFEIFFER.